United States Patent [19]
Kono et al.

[11] Patent Number: 5,093,608
[45] Date of Patent: Mar. 3, 1992

[54] MOTOR CONTROL APPARATUS

[75] Inventors: Shinichi Kono; Hironobu Takahashi, both of Oshino, Japan

[73] Assignee: Fanuc Ltd., Yamanashi, Japan

[21] Appl. No.: 455,312

[22] PCT Filed: May 29, 1989

[86] PCT No.: PCT/JP89/00534

§ 371 Date: Jan. 10, 1990

§ 102(e) Date: Jan. 10, 1990

[87] PCT Pub. No.: WO89/12349

PCT Pub. Date: Dec. 14, 1989

[30] Foreign Application Priority Data

Jun. 2, 1988 [JP] Japan .................. 63-136262

[51] Int. Cl.⁵ .............................................. G05B 19/18
[52] U.S. Cl. .................................... 318/601; 318/625
[58] Field of Search ............. 318/138, 254, 439, 600, 318/601, 625, 569, 638, 671

[56] References Cited

U.S. PATENT DOCUMENTS

| | | | |
|---|---|---|---|
| 4,257,103 | 3/1981 | Suzuki et al. | 318/625 X |
| 4,297,624 | 10/1981 | Komiya | 318/594 |
| 4,422,040 | 12/1983 | Raider et al. | 318/696 X |
| 4,464,615 | 8/1984 | Rodi | 318/625 |
| 4,617,635 | 10/1986 | Shimizu | 318/571 X |
| 4,639,645 | 1/1987 | Hartwig | 318/51 |
| 4,641,069 | 2/1987 | Fujioka et al. | 318/625 |
| 4,644,232 | 2/1987 | Nojiri et al. | 318/66 |
| 4,687,975 | 8/1987 | Suzuki | 318/16 X |
| 4,744,041 | 5/1988 | Strunk et al. | 318/245 X |
| 4,751,438 | 6/1988 | Markunas | 318/254 |
| 4,837,491 | 6/1989 | Fujioka et al. | 318/625 |
| 4,868,467 | 9/1989 | Davis | 318/254 |
| 4,931,712 | 6/1990 | DiGiulio et al. | 318/625 |

FOREIGN PATENT DOCUMENTS 55-78307 6/1980 Japan .
59-89592 5/1984 Japan .
59-123489 7/1984 Japan .

*Primary Examiner*—Bentsu Ro
*Attorney, Agent, or Firm*—Staas & Halsey

[57] ABSTRACT

A motor control apparatus according to this invention is for setting control parameters which correspond to a motor model in a case where machine tools controlled by a numerical control unit or the like employ a large variety of motor models, with control parameters corresponding to these motor models being set and changed externally. Accidents due to erroneous setting of the control parameters is reliably prevented. The apparatus includes registering means (22) in which a specific model code representing the control parameters of a respective motor model is registered in advance, and memory means (21) for temporarily storing the set control parameters as well as a model code transferred along with the control parameters. The model code registered in the registering means (22) is compared with the transferred model code to identify the motor model.

2 Claims, 1 Drawing Sheet

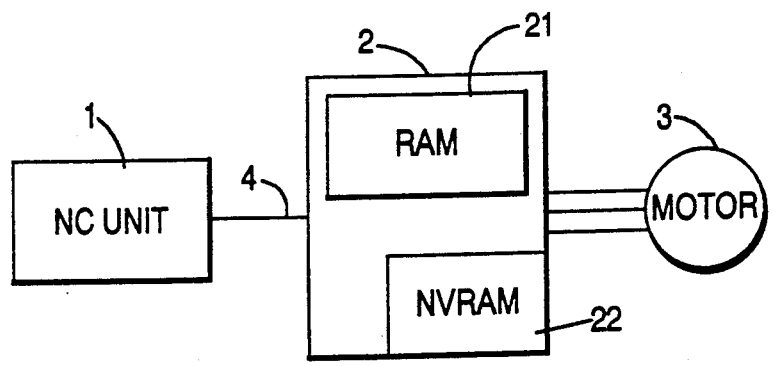
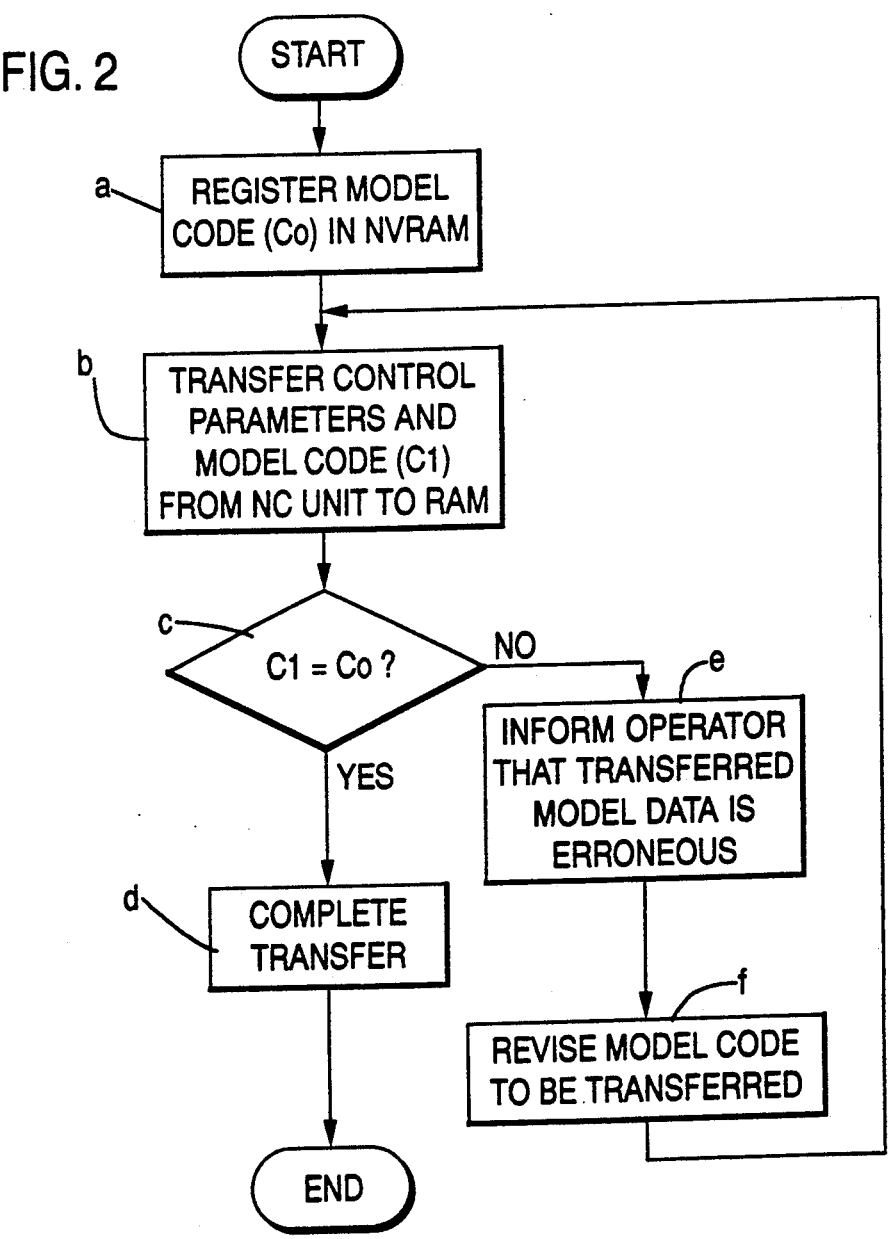

MOTOR CONTROL APPARATUS

DESCRIPTION

1. Technical Field

This invention relates to a motor control apparatus in which, when a machine tool controlled by a numerical control unit or the like employs a large variety of motor models, control parameters corresponding to these motor models can be set and changed externally.

2. Background Art

In an ordinary numerical control unit, control parameters regarding acceleration, rapid-traverse velocity and the like are entered from, say, an MDI/DPL unit in accordance with the motor model which is the object of control, and the control parameters corresponding to the motor control apparatus are set before the machine tool starts operating. These parameters are set in addition to the program which applies control commands to the machine tool. Since machine tools controlled by a numerical control unit or the like often employ a wide variety of motor models at the same time, it is necessary to set accurate control parameters corresponding to each of these motor models, and it is essential to maintain universality of numerical control in the motor control apparatus.

The operation for setting the control parameters by means of the conventional numerical control unit requires that tens of control parameters be specified for each type of motor model and that these parameters be set in the motor control apparatus. Since the procedure for setting these control parameters usually is a manual task performed by the operator, there is the possibility that an accident can be caused due to erroneous setting of the control parameters. Further, in a case where the control parameters are set in an NC tape along with a machining program without relying upon a manual operation, it is possible to read the parameters automatically and set them in the motor control apparatus before the program is run. However, even in this case it is necessary to accurately detect agreement between the motor model to be controlled and the machining program, and erroneous settings sometimes occur.

SUMMARY OF THE INVENTION

The present invention has been devised in order to solve these problems and its object is to provide a motor control apparatus in which the operation for recognizing the type of motor model is automated and accidents caused by erroneous setting of control parameters are reliably prevented.

In accordance with the present invention, there can be provided a motor control apparatus for controlling motors having different control parameters, in which the control parameters can be set and changed externally and a large variety of motor models are capable of being controlled selectively, characterized by comprising registering means in which a specific model code representing the control parameters of a respective motor model is registered in selecting any of the motors, memory means for temporarily storing the set control parameters as well as a model code transferred along with the control parameters, and comparing means for comparing the model code registered in the registering means with the transferred model code.

The motor control apparatus of the present invention is such that the model code of a motor model to be controlled is registered and agreement is obtained between this code and the model code stored in memory at the same time as the transferred control parameters. As a result, the operator is capable of identifying the motor model with assurance.

BRIEF DESCRIPTION OF THE DRAWINGS

FIG. 1 is a block diagram illustrating an embodiment of the invention, and FIG. 2 is a view illustrating an operating flow for identifying a motor model.

DESCRIPTION OF THE PREFERRED EMBODIMENT

An embodiment of the present invention will now be described in detail with reference to the drawings.

FIG. 1 is a diagram showing the basic construction of a system which includes an NC unit 1 for forming the control commands of a machine tool.

A motor control apparatus 2 in which control parameters can be variably set in a memory circuit such as a RAM from the outside is provided to correspond to each servomotor 3 of a respective machine tool. The motor 3 is for driving a spindle or workpiece table along each axis in accordance with a predetermined controlled variable. The NC unit 1 and the motor control apparatus 2 are interconnected by a data line 4 so that transfer of the necessary control information can be carried out. It can be arranged so that all or a portion of the circuitry of the motor control apparatus 2 is contained in the NC unit 1.

The motor control apparatus 2 has memory means, e.g., a RAM 21, for storing control parameters conforming to the type of motor 3 connected, registering means, e.g., an NVRAM (non-volatile random-access memory) 22 in which is registered a preset model code Co of the motor to be driven and controlled, and comparing means such as a microprocessor for comparing a model code C1, which is included in the control parameters transferred to the RAM 21, with the registered model code Co.

The NVRAM 22 serving as the registering means is a non-volatile memory circuit and is exchangeable with other similarly operating circuits, such as an EEP (electrical erasable programmable) ROM. When a set model is changed, the model code can be written anew at any time.

FIG. 2 shows the operating flow for identifying a motor model.

The procedure through which specific control parameters are set in the motor control apparatus 2 first involves registering, in the NVRAM 22, the model code of the motor 3 used. It is possible to perform this when the machine tool is assembled. For example, the NVRAM 22 having the predetermined model code stored therein may be installed in the motor control apparatus 2 (step a).

Next, the NC unit 1 transfers the model code (C1), along with the control parameters, to the RAM within the motor control apparatus 2 (step b).

It is determined within the motor control apparatus 2 whether the registered model code Co and the transferred model code C1 agree (step c). If they do agree, it is judged that the motor is capable of operating in accordance with the transferred control parameters. In other words, when agreement is achieved, transfer of the control parameters is completed (step d).

In case of non-agreement, the operator is informed of the fact that the transferred model data is erroneous (step e).

Thereafter, the model code C1 to be transferred is revised automatically or by the operator in the NC unit 1 (step f), and the revised model code C1 is transferred from the NC unit 1 to the RAM 21 in motor control apparatus 2 along with different control parameters.

In any case, by virtue of the motor control apparatus 2, the operator is capable of acquiring accurate recognition of the motor model used by the machine tool and accidents due to erroneous setting of control parameters can be prevented with assurance.

It is permissible to adopt an arrangement in which the operator is merely provided with a prescribed alarm warning when non-agreement of codes is sensed at step c.

Though an embodiment of the present invention has been described, the invention is not limited to this embodiment but can be modified in various ways without departing from the scope of the claims.

INDUSTRIAL APPLICABILITY

The motor control apparatus of the present invention is such that a model code is set in advance and it is determined whether control parameters transferred from an NC unit have been transferred correctly. As a result, the risk of erroneous control parameter settings is eliminated, maintenance is simplified and accidents can be prevented.

We claim:

1. A motor control apparatus for controlling motors having respective control parameters and associated model codes, said apparatus comprising;
   registering means for storing a preset model code associated with a selected one of the motors;
   memory means for storing the control parameters and the model code of the selected motor; and
   comparing means for comparing the present model code stored in said registering means with the model code stored in said memory means.

2. A motor control apparatus according to claim 1 wherein said comparing means includes:
   means for comparing the model code stored in said registering means with the model code stored in said memory means when the model code is transferred to the memory means, and
   means for sounding an alarm when the model code stored in said memory means is different from the present model code stored in said registering means.

* * * * *